United States Patent
Szafraniec (10) Patent No.: US 9,673,900 B2
(45) Date of Patent: Jun. 6, 2017

(54) OPTICALLY SYNTHESIZED TRACKING SIGNAL SOURCE AND NETWORK ANALYZER USING SAME

(71) Applicant: Keysight Technologies, Inc., Minneapolis, MN (US)

(72) Inventor: Bogdan Szafraniec, Santa Clara, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 14/729,702

(22) Filed: Jun. 3, 2015

(65) Prior Publication Data

US 2016/0359556 A1    Dec. 8, 2016

(51) Int. Cl.
| | |
|---|---|
| H04B 17/00 | (2015.01) |
| H04B 10/079 | (2013.01) |
| H04B 10/2575 | (2013.01) |
| H04B 10/077 | (2013.01) |

(52) U.S. Cl.
CPC ..... H04B 10/07955 (2013.01); H04B 10/077 (2013.01); H04B 10/2575 (2013.01)

(58) Field of Classification Search
CPC ............ H04B 10/07955; H04B 10/077; H04B 10/2575
USPC .......................................................... 398/16
See application file for complete search history.

(56) References Cited

U.S. PATENT DOCUMENTS

| 6,335,814 B1 | 1/2002 | Fuse et al. |
|---|---|---|
| 6,487,004 B1 | 11/2002 | Strutz et al. |
| 6,940,638 B2 | 9/2005 | Kondoh et al. |
| 7,460,793 B2 | 12/2008 | Taylor |
| 7,809,222 B2 | 10/2010 | Hartl et al. |

(Continued)

FOREIGN PATENT DOCUMENTS

| CN | 104202085 A | 12/2014 |
|---|---|---|
| CN | 104216196 A | 12/2014 |

(Continued)

OTHER PUBLICATIONS

Karim, "High Dynamic Range Microwave Photonic Links for RF Signal Transport and RF-IF Conversion", Journal of Lightwave Technology, vol. 25, No. 15, p. 2718-2724, Aug. 1, 2008.

(Continued)

*Primary Examiner* — Juan A Torres (57) ABSTRACT

Optical synthesis of frequency-tracking signals employs square-law based frequency conversion of pairs of optical signals having a predetermined, relative frequency shift to provide output signals. An optically synthesized tracking signal source includes a square-law photodetector configured to provide a first output signal having a frequency equal to a frequency difference between a first optical signal pair. Another square-law photodetector is configured to provide a second output signal having a frequency equal to a frequency difference between a second optical signal pair that is a frequency-shifted version of the first pair. The signal source further includes an optical wavemeter configured to determine one or both of the first pair frequency difference and the second pair frequency difference. The first and second output signals are tracking signals having a frequency offset determined by a relative frequency shift between the first and second pairs of optical signals.

20 Claims, 3 Drawing Sheets

(56) References Cited

U.S. PATENT DOCUMENTS

| | | | |
|---|---|---|---|
| 8,981,273 | B2 | 3/2015 | Kuo |
| 2002/0114038 | A1 | 8/2002 | Arnon et al. |
| 2003/0057965 | A1 | 3/2003 | Toyoda et al. |
| 2003/0198477 | A1 | 10/2003 | Kuri et al. |
| 2004/0070766 | A1* | 4/2004 | Szafraniec ............... G01J 4/04 356/477 |
| 2006/0238770 | A1* | 10/2006 | Szafraniec ........... G01M 11/337 356/477 |
| 2007/0146721 | A1 | 6/2007 | Barcelos |
| 2011/0229138 | A1 | 9/2011 | Watanabe |
| 2013/0202303 | A1* | 8/2013 | Wilkinson ........... H04B 10/548 398/76 |
| 2014/0070072 | A1 | 3/2014 | Kuo |
| 2015/0002920 | A1 | 1/2015 | Shi |
| 2016/0103166 | A1 | 4/2016 | Szafraniec et al. |

FOREIGN PATENT DOCUMENTS

| | | | |
|---|---|---|---|
| DE | 102008027033 | B4 | 7/2010 |
| WO | 2009127843 | A1 | 10/2009 |

OTHER PUBLICATIONS

Notice of Allowance dated Oct. 24, 2016 in co-pending U.S. Appl. No. 14/729,773.
Abbas et al., "A dual-detector optical heterodyne receiver for local oscillator noise suppression", Journal of Lightwave Technology, vol. LT-3, No. 5, p. 1110-1122, Oct. 1985.
Alferness et al., "Velocity-matching techniques for integrated optic traveling wave switch/modulators", IEEE Journal of Quantum Electronics, vol. QE-20, No. 3, p. 301-309, Mar. 1984.
Blanc et al., "Optical Mixing Techniques", 4 pages, Nov. 26, 2014 [date downloaded by inventor Szafraniec].
Cheng et al., "Baseband integrated acoustic-optic frequency shifter", Applied Physics Letters, vol. 60, No. 12, p. 12-14, Jan. 6, 1992.
Baney, "Elementary Matrix Method for Dispersion Analysis in Optical Systems", Journal of Lightwave Technology, vol. 28, No. 4, Feb. 15, 2010, 14 pages.
Ezra IP et al., "Coherent detection in optical fiber systems", Optics Express, p. 753-791, Jan. 21, 2008.
English language translation of DE 102008027033 B4, published Jul. 8, 2010, 20 pages.
Lu, et al., "An integrated heterodyne optical phase-locked loop with record offset locking frequency", 2014, 3 pages.
Noe et al., "Integrated-optic rotating waveplate frequency shifter", Electronics Letters, vol. 24, Issue 21, p. 1348-1349, Oct. 13, 1988.
Jones, "A New Calculus for the Treatment of Optical Systems. VII. Properties of The N-Matrices", Journal of The Optical Society of America vol. 38, No. 8, 15 pages, Aug. 1948.
Brimrose Corporation of America, "Instructions for RF Drivers", Retrieved from the Internet: <http://www.brimrose.com/pdfandwordfiles/aofvfd.pdf>, Oct. 30, 2014 [date downloaded by inventor Szafraniec].
"Electrical Network Analysis Using Optical Stimulus", the IP.com Journal, vol. 13, No. 4a, p. 325-328, Apr. 2013.
Yao, "Microwave Photonics", Journal of Lightwave Technology, vol. 27, No. 3, Feb. 1, 2009.
"S-Parameters Theory and Application", Hewlett-Packart Journal, Feb. 1967.

* cited by examiner

OPTICALLY SYNTHESIZED TRACKING SIGNAL SOURCE AND NETWORK ANALYZER USING SAME

CROSS-REFERENCE TO RELATED APPLICATIONS

This application is related to a co-pending U.S. patent application Ser. No. 14/729,733, filed Jun. 3, 2015, which is incorporated by reference herein in its entirety.

STATEMENT REGARDING FEDERALLY SPONSORED RESEARCH OR DEVELOPMENT

N/A

BACKGROUND

Radio frequency (RF) and microwave systems often employ pairs of signals that are configured to track one another over a range of frequencies. For example, in a network analyzer, a local oscillator (LO) signal is often configured to track a frequency of an RF test signal to facilitate s-parameter measurements. By frequency tracking, the LO signal can be used to convert (e.g., downconvert) one or both the RF test signal and a response signal of a device under test (DUT) to a fixed intermediate frequency. The fixed intermediate may simplify an implementation of a measurement portion or 'test set' of the network analyzer, for example, as well as support high performance characteristics of the network analyzer measurement portion.

Unfortunately, as DUT bandwidth and concomitant frequency range requirements of modern RF/microwave systems increase, a tuning range of the RF test signal and tracking LO signal must be similarly increased. However, with conventional frequency-tracking signal synthesis and the signal sources that use such synthesis (e.g., phase-locked loop RF sources) it can be difficult to achieve frequency tuning ranges sufficient to meet the needs of many modern RF/microware systems.

BRIEF SUMMARY

In some embodiments of the principles described herein, an optically synthesized tracking signal source is provided. The optically synthesized tracking signal source comprises a first square-law photodetector configured to provide a first output signal having a frequency equal to a frequency difference between a first pair of optical signals. The optically synthesized tracking signal source further comprises a second square-law photodetector configured to provide a second output signal having a frequency equal to a frequency difference between a second pair of optical signals, the second optical signal pair being a frequency-shifted version of the first pair of optical signals. The optically synthesized tracking signal source further comprises an optical wavemeter configured to determine one or both of the first pair frequency difference and the second pair frequency difference. The first and second output signals are tracking signals having a frequency offset determined by a relative frequency shift between the first and second pairs of optical signals.

In other embodiments of the principles described herein, a network analyzer having an optically synthesized tracking signal source is provided. The network analyzer includes a radio frequency (RF) source comprising a square-law photodetector configured to generate an RF test signal from a first pair of optical signals, an optical signal of the first pair being tunable. The network analyzer further includes a local oscillator (LO) source comprising another square-law photodetector configured to generate an LO signal from a second pair of optical signals derived from the first pair of optical signals. The second pair comprises an optical signal having a predetermined frequency shift relative to a corresponding optical signal of the first pair. The network analyzer further includes an optical wavemeter configured to determine a frequency difference between optical signals of a respective pair of one or both of the first optical signal pair and the second optical signal pair. The RF test signal and the LO signal are configured to track one another with a frequency difference corresponding to the predetermined frequency shift.

In other embodiments of the principles described herein, a method of optically synthesizing a pair of tracking signals is provided. The method comprises generating a first output signal using a square-law photodetector. The first output signal has a frequency equal to a frequency difference between a first pair of optical signals. The method further comprises generating a second output signal using another square-law photodetector. The second output signal has a frequency equal to a frequency difference between optical signals of a second pair of optical signals, the second optical signal pair being a frequency-shifted version of the first pair of optical signals. The method further includes determining one or both of the first pair frequency difference and the second pair frequency difference using an optical wavemeter. The first and second output signals track one another over a tunable frequency range of an optical signal of the first optical signal pair.

BRIEF DESCRIPTION OF THE DRAWINGS

Various features of embodiments and examples in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Embodiments and examples consistent with the principles described herein provide optical synthesis of frequency-tracking signals and a source to generate the frequency-tracking signals. In particular, a pair of signals may be synthesized from a plurality of optical signals, according to various embodiments consistent with the principles described herein. The optically synthesized signals of the pair may each have a frequency ranging from substantially zero hertz (Hz) or 'DC' to about several hundreds of gigahertz (GHz), according to some embodiments. Moreover, the signal frequency may be varied or tuned across all or a portion of the frequency range of the optically synthesized signals. Further, according to various embodiments, the optically synthesized signals may have a substantially constant, predetermined frequency offset from one another. The predetermined frequency offset may be maintained or be substantially fixed and constant across the frequency range of the optically synthesized signal pair, according to various embodiments. In other words, the optically synthesized signals are frequency-tracking signals. Application of the frequency-tracking, optically synthesized signal pair includes, but is not limited to, use as one or both of a radio frequency (RF) test signal and tracking local oscillator (LO) signal of a network analyzer, according to some embodiments.

Herein, the term 'optical signal' is a signal having a frequency or equivalently a wavelength that is in the optical frequency or wavelength range. For example, an optical signal may be produced by an optical source such as, but not limited to, a light emitting diode or a laser (e.g., a laser diode). Further herein, the term 'optical signal' is used to distinguish the signal from other signals having much lower frequencies that may generally be classified as 'electrical' signals. So-called 'electrical signals' by definition herein may include, but are not limited to, signals having frequencies in the radio frequency (RF) range, microwave range, or millimeter wave frequency range. That is, an electrical signal may be an RF signal, a microwave signal, or a millimeter wave signal, according to various embodiments. Herein, the term 'RF' when applied to a signal is defined to include RF, microwave and millimeter wave signals for simplicity of discussion unless otherwise explicitly stated. Similarly by definition herein, the term 'intermediate frequency (IF)' is used herein to describe frequencies and signals (i.e., electrical signals) that are at a different frequency than the RF signal, especially where the different frequency is the result of a conversion of the RF signal in a frequency converter. In many cases herein, the IF signal is the result of a downconversion of the RF signal such that the intermediate frequency is at a lower frequency than RF.

Further, as used herein, the article 'a' is intended to have its ordinary meaning in the patent arts, namely 'one or more'. For example, 'a signal' means one or more signals and as such, 'the signal' means 'the signal(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or in some examples, means plus or minus 10%, or plus or minus 5%, or plus or minus 1%, unless otherwise expressly specified. Further, herein the term 'substantially' as used herein means a majority, or almost all, or all, or an amount within a range of about 51% to about 100%, for example. Moreover, examples herein are intended to be illustrative only and are presented for discussion purposes and not by way of limitation.

In accordance with some embodiments of the principles described herein, an optically synthesized tracking signal source is provided. The optically synthesized tracking signal source is configured to provide output signals that are synthesized from optical signals of a plurality of optical signals. In particular, the output signals are synthesized from pairs of the optical signals using square-law frequency conversion and thus, the output signals have frequencies representing differences between optical frequencies of the optical signals in respective pairs of the optical signals. Therefore, the synthesized output signals may generally be classified as 'electrical' signals as opposed to 'optical' signals and may include, but are not limited to, signals having frequencies in the radio frequency (RF) range, microwave range, or millimeter wave frequency range. That is, an output signal provided by the optically synthesized tracking signal source may be an RF signal, a microwave signal, or a millimeter wave signal, according to various embodiments.

Further, according to various embodiments, output signals synthesized from the optical signal plurality may be frequency offset from one another and also may be configured to track one another in frequency over a frequency range of the output signals. In particular, an output signal provided by the optically synthesized tracking signal source may have a frequency that is offset or spaced apart from a frequency of another output signal. Further, the frequency offset or spacing between the output signals may be substantially maintained or remain constant over a range of frequencies of the output signals (e.g., over a tuning range). For example, the output signals may have frequencies spaced apart from one another by an amount equal to an intermediate frequency (IF). As frequency of the output signals is changed or tuned over a tuning range of the output signals, the output signal frequencies may track one another such that the output signal frequencies always differ by the intermediate frequency, for example. As such, the output signals provided by the optically synthesized tracking signal source may be referred to as 'tracking' or more specifically 'frequency-tracking' output signals.

Figure 1A:
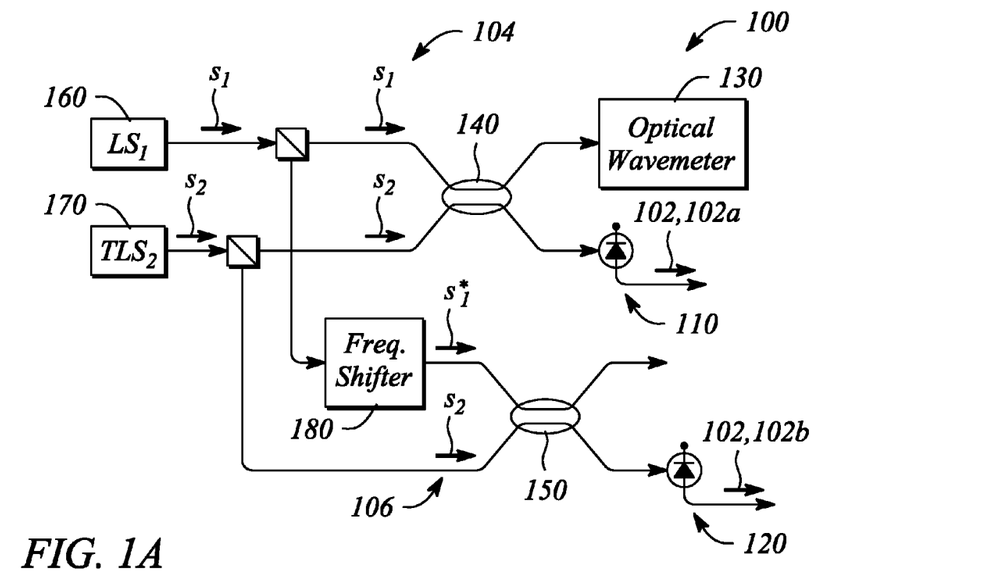
FIG. 1A illustrates a block diagram of an optically synthesized tracking signal source in an example, according to an embodiment consistent with the principles described herein.
Figure 1B:
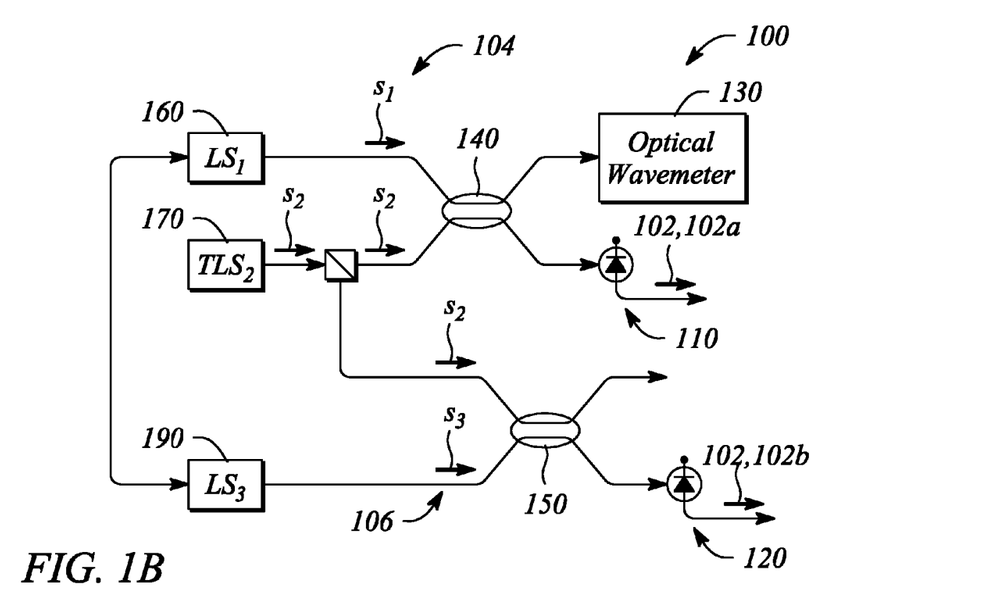
FIG. 1B illustrates a block diagram of an optically synthesized tracking signal source in an example, according to another embodiment consistent with the principles described herein.

FIG. 1A illustrates a block diagram of an optically synthesized tracking signal source 100 in an example, according to an embodiment consistent with the principles described herein. FIG. 1B illustrates a block diagram of an optically synthesized tracking signal source 100 in an example, according to another embodiment consistent with the principles described herein. In both of FIGS. 1A and 1B, first and second frequency-tracking output signals 102a and 102b, respectively, (collectively referred to as '102') are provided, as illustrated by respective bold arrows. In some examples, the frequency-tracking output signals 102 provided by the optically synthesized tracking signal source 100 may be RF signals having a substantially constant frequency offset equal to an intermediate frequency, for example.

As illustrated, the optically synthesized tracking signal source 100 comprises a first square-law photodetector 110. The first square-law photodetector 110 is configured to provide a first frequency-tracking output signal 102a having a frequency equal to a frequency difference between a first pair of optical signals 104. For example, the first pair of optical signals 104 may comprise a first optical signal $s_1$ and a second optical signal $s_2$, as illustrated in FIGS. 1A-1B. The first optical signal $s_1$ may have an optical frequency $f_1$ and the second optical signal $s_2$ may have an optical frequency $f_2$ that differs from the first optical frequency $f_1$, for example. According to various embodiments, the first square-law photodetector 110 is configured to 'mix' or perform a square-law frequency conversion of the first pair of optical signals 104 (i.e., the first and second optical signals $s_1$, $s_2$)

to provide the first frequency-tracking output signal 102a having a frequency $F_{out,1}$. The first output signal frequency $F_{out,1}$ equals a difference (i.e., a positive difference) between the optical frequencies of the first pair of optical signals 104, according to various embodiments. For example, the first output signal frequency $F_{out,1}$ may be given by equation (1) as $$F_{out,1}=|f_1-f_2| \quad (1)$$

where |•| represents a magnitude operator and the first output signal frequency $F_{out,1}$ is a positive frequency.

The optically synthesized tracking signal source 100 illustrated in FIGS. 1A and 1B further comprises a second square-law photodetector 120. The second square-law photodetector 120 is configured to provide a second frequency-tracking output signal 102b having a frequency equal to a frequency difference between a second pair of optical signals 106. According to various embodiments, the second pair of optical signals 106 is or represents a frequency-shifted version of the first pair of optical signals 104. As a result, the first frequency-tracking output signal 102a and the second frequency-tracking output signal 102b generally have different frequencies (i.e., are offset in frequency from one another). In particular, the frequency difference of the second pair of optical signals 106 differs from the frequency difference of the first pair optical signals 104 of the first pair by or due to a relative frequency shift between the first and second pairs of optical signals 104, 106. Therefore, the first output signal frequency and the second output signal frequency have a frequency offset from one another determined by the relative frequency shift.

According to various embodiments, the second pair of optical signals 106 may comprise a frequency-shifted version of one or both of the first optical signal $s_1$ and a second optical signal $s_2$. In particular, the second pair of optical signals 106 are derived from corresponding ones of the first optical signal $s_1$ and the second optical signal $s_2$ either directly or using a frequency shift. For example (e.g., as illustrated in FIGS. 1A and 1B), the second pair of optical signals 106 may comprise the second optical signal $s_2$ and a frequency-shifted version of the first optical signal $s^*_1$ having an optical frequency $f^*_1$ that differs from the first optical frequency $f_1$ by a predetermined frequency shift $f_{shift}$ (i.e., $f^*_1=f_1-f_{shift}$). Note that, in general, the predetermined frequency shift $f_{shift}$ may be either a positive frequency shift or a negative frequency shift. In another example (not illustrated), the second pair of optical signals 106 may comprise the first optical signal $s_1$ and a frequency-shifted version of the second optical signal $s^*_2$. In this example, an optical frequency $f^*_2$ of the frequency-shifted version of the second optical signal $s^*_2$ may differ from the second optical frequency $f_2$ by the predetermined frequency shift $f_{shift}$ (i.e., $f^*_2=f_2-f_{shift}$). In either of the examples above, a difference between the first pair frequency difference and the second pair frequency difference is equal to the predetermined frequency shift $f_{shift}$. In yet another example, both optical signals of the second pair of optical signals 106 may be frequency-shifted optical signal versions of respective ones of the first and second optical signals $s_1$, $s_2$ in the first pair of optical signals 104. The predetermined frequency shift $f_{shift}$ may be provided when a sum of the optical frequencies $f^*_1$, $f^*_2$ of the frequency-shifted versions of the first and second optical signals $s^*_1$, $s^*_2$ of the second pair differs from a sum of the optical frequencies $f_1$, $f_2$ of the first and second optical signals $s_1$, $s_2$ of the first pair by an amount equal to the predetermined frequency shift $f_{shift}$ (i.e., $|(f^*_1+f^*_2)-(f_1+f_2)|=f_{shift}$).

According to various embodiments, the second square-law photodetector 120 is configured to 'mix' or provide a square-law frequency conversion of the second pair of optical signals 106 to provide the second frequency-tracking output signal 102b having a frequency $F_{out,2}$ that equals a difference (i.e., a positive difference) between the optical frequencies of the second pair of optical signals 106. For example, with reference to the first example above, the second output signal frequency $F_{out,2}$ may be given by equation (2) as $$F_{out,2}=|f^*_1-f_2| \quad (2)$$

where $F_{out,2}$ is a positive frequency and |•| represents the magnitude operator. Note that in equation (2), $F_{out,2}$ is equal to $F_{out,1}$ modified by the predetermined frequency shift $f_{shift}$. Further, equation (2) may be readily modified to represent the other examples above by appropriate substitutions of frequencies (e.g., $f^*_2$ for $f_2$ or $f_1$ for $f^*_1$), as detailed in the respective examples.

According to various embodiments, the relative frequency shift between the first and second pairs of optical signals 104, 106 that determines the frequency offset of the first and second frequency-tracking output signals 102a, 102b is equal to the predetermined frequency shift $f_{shift}$. Further, since the second pair of optical signals 106 are derived from or represent frequency-shifted versions of the first pair of optical signals 104, any change in a frequency of the first pair of optical signals 104 (e.g., a change of one or both of the optical frequencies $f_1$, $f_2$) will be reflected in a similar change in a frequency of the second pair of optical signals 106. For example, if the optical frequency $f_2$ of the second optical signal $s_2$ in the first pair is changed (e.g., by tuning, as described below), the corresponding optical signal $s_2$ of the second pair will be changed in a substantially similar manner. As such, the first pair frequency difference and the second pair frequency difference track one another. Further, since the first and second frequency-tracking output signals 102a, 102b have frequencies determined by the frequency differences of the first and second pairs of optical signals 104, 106, the frequency of the second output signal 102b will track the frequency of the first frequency-tracking output signal 102a.

In some embodiments, the first square-law photodetector 110 may comprise a photodiode (e.g., as illustrated in FIGS. 1A and 1B). In some embodiments, the second square-law photodetector 120 may be substantially similar to the first square-law photodetector 110. For example, the second square-law photodetector 120 may comprise a photodiode (e.g., as illustrated in FIGS. 1A and 1B). In other embodiments, one or both of the first square-law photodetector 110 and the second square-law photodetector 120 may comprise another device that provides square-law frequency conversion or square-law detection at optical frequencies including, but not limited to, a PIN photodiode, a metal-semiconductor-metal (MIM) photodiode, a photonic transistor or a similar device that is configured to exhibit non-linearity at optical frequencies.

According to various embodiments, the optically synthesized tracking signal source 100 illustrated in FIGS. 1A and 1B further comprises an optical wavemeter 130. In some embodiments, the optical wavemeter 130 is configured to determined one or both of the first pair frequency difference and the second pair frequency difference. In particular, in some embodiments, the optical wavemeter 130 may be used to measure and thus determine the frequency difference between the first pair of optical signals 104 (i.e., the first pair frequency difference). Since the second pair of optical signals 106 are derived from the first pair optical signals 104 using a predetermined frequency shift, as described above, measuring the first pair frequency difference may facilitate determining the second pair frequency difference. Likewise, measuring the frequency difference between the second pair of optical signals 106 using the optical wavemeter 130 may facilitate determining the first pair frequency difference. According to various embodiments, the determined first pair frequency difference provides a determination or measurement of the frequency $F_{out,1}$ of first frequency-tracking output signal 102a. Similarly, the determined second pair frequency difference provides a determination or measurement of the frequency $F_{out,2}$ of second frequency-tracking output signal 102b, according to various embodiments.

In other embodiments, the optical wavemeter 130 may be used to determine an absolute optical frequency (e.g., as opposed to a relative optical frequency) of one or both of the optical signals in a pair of optical signals (e.g., the first pair or second pair of optical signals 104, 106). For example, the optical wavemeter 130 may be used to determine an absolute optical frequency of each of the optical signals in a pair of optical signals (e.g., the first pair or the second pair) and then the frequency difference between the optical signals may be computed (e.g., by subtraction) from the determined absolute optical frequencies. In another example, a first optical signal and a relative optical frequency of a second optical signal of a pair of optical signal (e.g., one or both of the first pair and the second pair) may be determined or measured by the optical wavemeter 130. However, determining or measuring a frequency difference between optical signals of a pair using the optical wavemeter 130 may not include determining an absolute frequency of either of the optical signals of the pair, according to various embodiments.

In some embodiments (e.g., as illustrated in FIGS. 1A and 1B), the optically synthesized tracking signal source 100 further comprises a first optical combiner 140. The first optical combiner 140 is configured to combine a first optical signal of the first pair with a second optical signal of the first pair. A first output of the first optical combiner 140 may be connected to an input of the first square-law photodetector 110 (e.g., as illustrated). In particular, the connection between the first optical combiner 140 and the first square-law photodetector 110 is configured to provide the combined first and second optical signals as the first pair to the first square-law photodetector 110, as illustrated. Various optical combiners may be used as the first optical combiner 140 including, but not limited to, a fiber optic coupler, an integrated optics coupler, or a prism beam combiner.

In some embodiments (e.g., as illustrated in FIGS. 1A and 1B), the optically synthesized tracking signal source 100 further comprises a second optical combiner 150. The second optical combiner 150 is configured to combine optical signals of the second pair, as described above. As illustrated, a first output of the second optical combiner 150 may be connected to an input of the second square-law photodetector 120. In particular, the connection of the second optical combiner 150 to the second square-law photodetector 120 is configured to provide the combined optical signals as the second pair to the second square-law photodetector 120, as illustrated. According to some embodiments, the second optical combiner 150 may be substantially similar to the first optical combiner 140. For example, the second optical combiner 150 may include, but is not limited to, a fiber optic coupler, an integrated optics coupler, or a prism beam combiner.

In some embodiments, one or both of the first optical combiner 140 and the second optical combiner 150 may include a second output. In some of these embodiments (e.g., as illustrated), an input of the optical wavemeter 130 may be connected to a second output of the first optical combiner 140. When connected to the second output of the first optical combiner 140, the optical wavemeter 130 may receive the combined first and second optical signals of the first pair, for example. In other ones of these embodiments (not illustrated), the input of the optical wavemeter 130 may be connected to a second output of the second optical combiner 150. In these embodiments, the optical wavemeter 130 is configured to receive the combined optical signals of the second pair.

According to some embodiments, the optically synthesized tracking signal source 100 further comprises a first laser source 160 and a second laser source 170. In particular, as illustrated in FIGS. 1A and 1B, the first laser source 160 ($LS_1$) may be configured to provide the first optical signal $s_1$ of the first pair of optical signals 104. Also as illustrated in FIGS. 1A and 1B, the second laser source 170 may be configured to provide the second optical signal $s_2$ of the first pair of optical signals 104. In some embodiments, the second laser source 170 may comprise a tunable laser. In these embodiments, the tunable second laser source 170 ($TLS_2$) is configured to provide the second optical signal $s_2$ having a tunable optical frequency. The tunable optical frequency of the second optical signal $s_2$ may be tunable across a frequency range between a first optical frequency and a second optical frequency, for example. Further, the tunable optical frequency may facilitate tuning the first output signal frequency $F_{out,1}$ over a tunable frequency range corresponding to the frequency range of the tunable optical frequency, according to various embodiments.

According to some embodiments, the optically synthesized tracking signal source 100 may further comprise a frequency shifter 180. The frequency shifter 180 is configured to apply a predetermined frequency shift to one or both of the first optical signal and the second optical signal of the first pair of optical signals 104. The applied predetermined frequency shift may be the predetermined frequency shift $f_{shift}$ described above, for example. According to these embodiments, the second pair of optical signals 106 comprises an output signal of the frequency shifter and the predetermined frequency shift is configured to determine the relative frequency shift between the first and second pairs of optical signals.

For example, as illustrated in FIG. 1A, the frequency shifter 180 may receive the first optical signal $s_1$ from the first laser source 160. The frequency shifter 180 may then apply the predetermined frequency shift $f_{shift}$ to the first optical signal $s_1$ and produce the frequency-shifted version of the first optical signal $s^*_1$. At an output of the frequency shifter, the optical frequency $f^*_1$ of the frequency-shifted version of the first optical signal $s^*_1$ differs from the first optical frequency $f_1$ of the first optical signal $s_1$ by the predetermined frequency shift $f_{shift}$, as illustrated. In other embodiments (not illustrated), the frequency shifter 180 may be located to receive and apply the predetermined frequency shift to the second optical signal $s_2$ to provide the frequency-shifted version the second optical signal $s^*_2$, for example. In yet other embodiments (not illustrated), the frequency shifter 180 may be configured to receive and provide frequency shifts to both the first and second optical signals $s_1$, $s_2$.

According to various embodiments, any of a variety of different frequency shifters may be used as the frequency shifter 180. For example, the frequency shifter 180 may comprise a nested Mach-Zehnder frequency shifter. The nested Mach-Zehnder frequency shifter may operate as a single sideband modulator to apply the predetermined frequency shift, for example. In other examples, the frequency shifter 180 may comprise another frequency shifter including, but not limited to, a spinning half-wave plate or an acousto-optic frequency shifter.

In other embodiments, the predetermined frequency shift of the frequency-shifted versions of the first and second optical signals is provided by a frequency-offset locked laser source. In particular, in some embodiments, the optically synthesized tracking signal source 100 further comprises a third laser source 190 ($LS_3$) having a frequency-offset lock to one of the first laser source 160 (e.g., as illustrated in FIG. 1B) and the second laser source 170 (not illustrated). The third laser source 190 is configured to provide a third optical signal $s_3$ that is a frequency-shifted version of the optical signal produced by the respective first and second laser sources 160, 170 to which the third laser source 190 is frequency offset locked. For example, as illustrated in FIG. 1B, the third laser source 190 is frequency-offset locked to the first laser source 160 (as indicated by a double headed arrow). In FIG. 1B, the third laser source 190 is configured to provide the third optical signal $s_3$ with a predetermined frequency shift relative to the frequency of the first optical signal $s_1$ (e.g., $s_3=s^*_1$). As illustrated in FIG. 1B, the third optical signal $s_3$ and the second optical signal $s_2$ are the second pair of optical signals 106 is the frequency-shifted version of the first pair of optical signals 104. Further, the predetermined frequency shift produced by the frequency-offset lock of the third laser source 190 provides the relative frequency shift between the first pair and the second pair of optical signals 104, 106, as illustrated.

Figure 2:
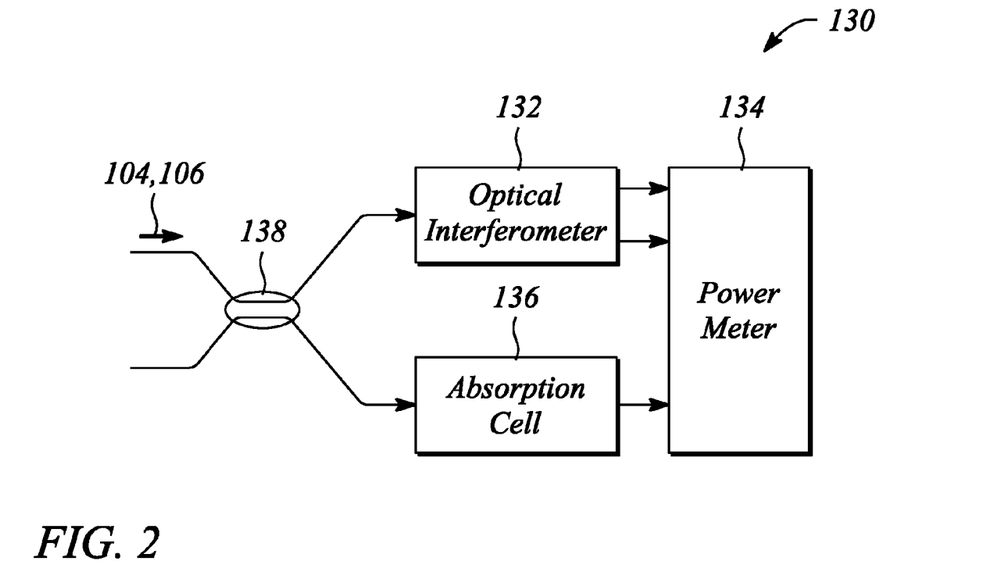
FIG. 2 illustrates a block diagram of an optical wavemeter in an example, according to an embodiment consistent with the principles described herein.

FIG. 2 illustrates a block diagram of an optical wavemeter 130 in an example, according to an embodiment consistent with the principles described herein. In particular, the optical wavemeter 130 is an example of a variety of different optical wavemeters that may be employed with the optically synthesized tracking signal source 100. As illustrated, the optical wavemeter 130 comprises an optical interferometer 132. The optical interferometer 132 may include, but is not limited to, a Michelson interferometer or a Mach-Zehnder interferometer, for example. The optical interferometer 132 is configured to receive a pair of optical signals. The pair of optical signals may be one or both of the first pair of optical signals 104 or the second pair of optical signals 106. The received pair of optical signals is illustrated as a bold arrow in FIG. 2.

The optical wavemeter 130 illustrated in FIG. 2 further comprises a power meter 134. The power meter 134 is configured to receive outputs (e.g., variably delayed and combined optical signals) from the optical interferometer 132. From optical power measurements of the optical interferometer outputs, the power meter 134 is configured to determine a frequency difference of the optical signals within the received pair of optical signals. The frequency difference between the optical signals may provide a measurement of the frequency of one or both of the first output signal and the second output signal of the optically synthesized tracking signal source 100, according to various embodiments.

In some embodiments (e.g., as illustrated in FIG. 2), the optical wavemeter 130 may further comprise an absorption cell 136. The absorption cell 136 is configured to receive the pair of optical signals. In turn, the power meter 134 is further configured to receive an output of the absorption cell 136. In other embodiments (not illustrated), an absorption cell may not be included and the optical signal from a coupler 138 may be directly provided to power meter 134.

When the absorption cell 136 is present, the power meter 134 may be configured to estimate an absolute frequency of one or both of the optical signals of the received optical signal pair from a measured power of the absorption cell output based on the location of the absorption peaks. In particular, a disturbance in the measured power of the output of the absorption cell 136 (or in the measured power of the received optical signal pair if absorption cell 136 is not used) as measured by the power meter 134 may serve as a marker to indicate when frequencies of the optical signals in the received pair are substantially equal. Further, if one of the optical signals of the received pair is tuned in frequency relative to the other, the marker may be used to establish when the frequencies of the optical signals start to move away from one another during frequency tuning of the optical signals. As described above with respect to the optical interferometer 132, the received optical signal pair may comprise one or both of the first pair of optical signals 104 or the second pair of optical signals 106.

As illustrated, the optical wavemeter 130 may further comprise an optical coupler 138 configured to couple the received optical signal pair into separate outputs, one output being connected to the optical interferometer 132 and another output being connected to the absorption cell 136 (or directly to power meter 134 when the absorption cell 136 is not employed). The optical coupler 138 may comprise a fiber optic coupler (e.g., a 2×2 single mode fiber optic coupler), for example.

According to various embodiments, the frequency (e.g., relative frequency) of one or both of the optical signals $s_1$ and $s_2$ may be estimated based on the power variation of the outputs of the optical interferometer 132. Further, the optical signals $s_1$ and $s_2$ can be distinguished from each other by a unique characteristic, for example, by a tuning speed, or a unique modulation. For example, at a constant tuning speed of the second optical signal $s_2$, sinusoidal variations of power may be observed at the outputs of the optical interferometer 132. A frequency of the sinusoidal fluctuations depends on the tuning speed and on a known or predetermined free spectral range (FSR) of the optical interferometer 132. When both of the optical signals $s_1$ and $s_2$ are tuned, but at different speeds (e.g., the first optical signal is tuned at a slower rate than the second optical signal), variations of power at two different frequencies appear at the outputs of the optical interferometer 132. Thus, the optical signals $s_1$ and $s_2$ may be separated based on the frequency of power fluctuation observed (e.g., by the power meter 134) at the optical interferometer outputs and each can be measured independently by counting cycles and fractional cycles of power fluctuations at two different frequencies. On the other hand, when only one signal (e.g. the second optical signal $s_2$) is tuned, the corresponding power fluctuations may be observed to estimate the frequency of the tuned optical signal. Thus, the optical signals $s_1$ and $s_2$ may be distinguished from each other based on their tuning speed and further may be independently measured, according to various embodiments.

In other embodiments, the optical signals $s_1$ and $s_2$ may be independently measured based on another unique characteristic that distinguishes the optical signals $s_1$ and $s_2$ such as, for example, an additional modulation applied to optical signals $s_1$ and $s_2$. In some embodiments (not illustrated), the optical signals $s_1$ and $s_2$ may be separately provided to a Mach-Zehnder optical interferometer 132 from opposite sides and further be output at opposite sides. Thus, the optical signals $s_1$ and $s_2$ may be separated from each other by a direction of propagation. Simultaneous measurement of the optical signals $s_1$ and $s_2$ in the same optical interferometer 132 provides a means for measuring their relative frequencies or frequency difference even in the presence of optical interferometer instabilities and drift, according to various embodiments. Thus, optical wavemeter 130 may serve as a wavemeter of the generated frequencies $F_{out,1}$ or $F_{out,2}$ without estimation of the absolute optical frequencies $f_1$ and $f_2$, according to various embodiments.

Figure 3:
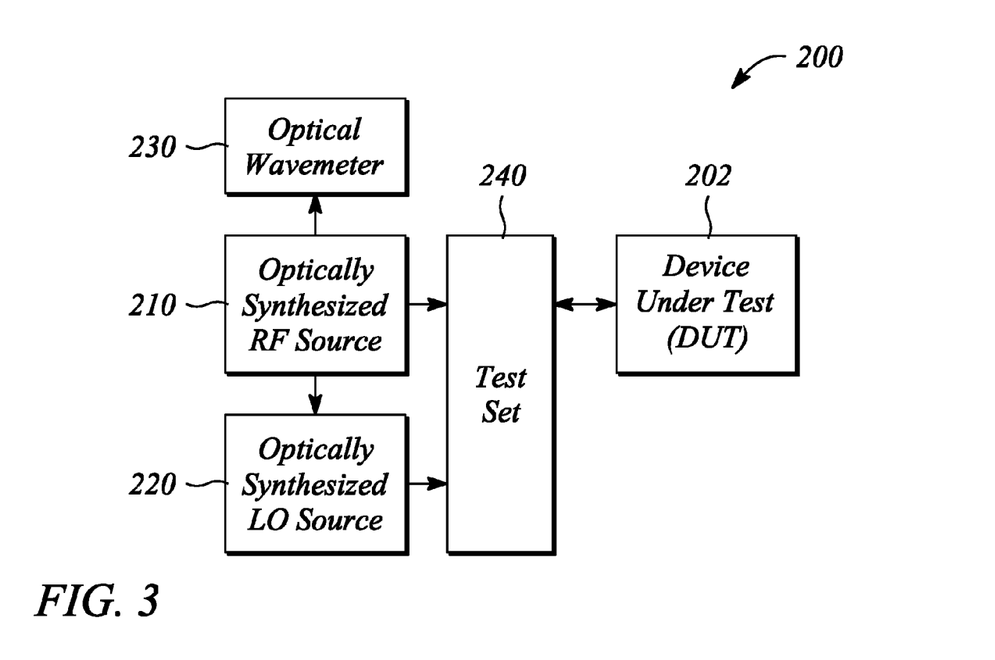
FIG. 3 illustrates a block diagram of a network analyzer having an optically synthesized tracking signal source in an example, according to an embodiment of the principles described herein.

In some embodiment according to the principles described herein, a network analyzer is provided. In particular, the provided network analyzer has an optically synthesized tracking signal source, according to various embodiments. FIG. 3 illustrates a block diagram of a network analyzer 200 having an optically synthesized tracking signal source in an example, according to an embodiment of the principles described herein. According to various embodiments, the network analyzer 200 may be employed to test a device under test (DUT) 202. For example, the network analyzer 200 may be used to determine s-parameters of the DUT 202. The optically synthesized tracking signal source may be used to provide a radio frequency (RF) test signal and a local oscillator (LO) signal, where the LO signal tracks the RF test signal over a tuning range of the RF test signal. According to various examples, the RF test signal may be applied to the DUT 202 (e.g., at a port thereof) by the network analyzer 200 and the local oscillator (LO) signal may be used by the network analyzer 200 to downconvert for analysis one or both of the applied RF test signal and a response signal from or produced by the DUT 202 (e.g., at a port thereof).

In some examples, the response signal is a signal reflected by the DUT 202 (e.g., used to determine a reflection coefficient or $s_{11}$ s-parameter). In other examples, the response signal is a signal transmitted through the DUT 202 (e.g., used to determine a transmission coefficient or $s_{21}$ s-parameter). Further, in either case, the response signal is responsive to the RF test signal applied to the DUT 202. In particular, the reflected signal may comprise a portion of the applied RF test signal that is reflected at an input port of the DUT 202 and the transmitted signal may comprise a portion of the applied RF test signal that is transmitted through the DUT 202 from the input port to another port thereof. The RF test signal and the LO signal are configured to track one another with a frequency offset equal to an intermediate frequency (IF) of the network analyzer 200, according to various embodiments.

As illustrated in FIG. 3, the network analyzer 200 having an optically synthesized tracking signal source comprises a radio frequency (RF) source 210. According to various embodiments, the RF source is an optically synthesized RF source 210. In particular, the RF source 210 comprises a square-law photodetector configured to generate the RF test signal from a first pair of optical signals. Further, an optical signal of the first pair is tunable, according to various embodiments. In some embodiments, the square-law photodetector of the RF source 210 is substantially similar to the first square-law photodetector described above with respect to the optically synthesized tracking signal source 100. Further, in some embodiments, the first pair of optical signals used by the RF source 210 may be substantially similar to the first pair of optical signals 104 and the RF test signal may be substantially similar to the first frequency-tracking output signal 102a of the frequency-tracking output signals 102, described above with respect to the optically synthesized tracking signal source 100. For example, the RF test signal produced by the RF source square-law photodetector may be tunable across an RF tuning range of the network analyzer 200 by tuning the tunable optical signal of the first pair of optical signals used by the RF source 210. In some embodiments, the first pair of optical signals may be produced by a pair of laser sources. A laser source of the laser source pair may be a tunable laser source to produce the tunable optical signal of the first pair of optical signals, according to some embodiments.

The network analyzer 200 illustrated in FIG. 3 further comprises a local oscillator (LO) source 220. According to various embodiments, the LO source 220 is an optically synthesized LO source 220 configured to track the RF source 210 (e.g., as indicated by an arrow from the RF source 210 to the LO source 220 in FIG. 3). In particular, the LO source 220 comprises another square-law photodetector. Note that the other square-law photodetector of the LO source 220 (hereinafter also referred to as the 'LO source square-law photodetector') is separate and distinct from the square-law photodetector of the RF source 210, by definition herein. The LO source square-law photodetector is configured to generate an LO signal from a second pair of optical signals. According to various embodiments, the second pair of optical signals is derived from the first pair of optical signals. Further, the second pair of optical signals comprises a predetermined frequency shift relative to the first pair of optical signals. For example, an optical signal of the second pair has the predetermined frequency shift relative to a corresponding optical signal of the first pair, from which the optical signal of the second pair was derived. In particular, the predetermined frequency shift may provide a frequency difference between a frequency of the LO signal and a frequency of the RF test signal equal to the intermediate frequency of the network analyzer 200. Moreover, the LO signal is configured to track the RF test signal to maintain the difference frequency corresponding to the predetermined frequency shift across a frequency tuning range of the RF test signal, according to various embodiments.

According to some embodiments, the LO source square-law photodetector may be substantially similar to second square-law photodetector 120 of the optically synthesized tracking signal source 100, described above. Further, in some embodiments, the second pair of optical signals used by the LO source 220 may be substantially similar to the second pair of optical signals 106 and the LO signal may be substantially similar to the second frequency-tracking output signal 102b of the frequency-tracking output signals 102, also described above with respect to the optically synthesized tracking signal source 100. For example, the LO signal produced by the LO source square-law photodetector may track the tunable RF test signal across the RF tuning range of the network analyzer 200 to maintain the frequency difference equal to the intermediate frequency of the network analyzer.

According to various embodiments, the network analyzer 200 further comprises an optical wavemeter 230. The optical wavemeter 230 is configured to determine a frequency difference between frequencies of the optical signals (e.g., equal to $F_{out,1}$ or $F_{out,2}$) of one or both of the optical signal pairs. For example, the optical wavemeter 230 may be connected to the RF source 210, as illustrated in FIG. 3, to receive and determine the frequency difference between the first pair of optical signals provided to the RF source square-law photodetector to generate the RF test signal. In another example (not illustrated), the optical wavemeter 230 may be connected to receive and determine the frequency difference between the second pair of optical signals used by the LO source square-law photodetector to generate the LO signal. The determined frequency difference produced by the optical wavemeter 230 may provide a measurement of frequency of one or both of the RF test signal and the LO signal, according to various embodiments. In some embodiments, the optical wavemeter 230 may be substantially similar to the optical wavemeter 130 of the optically synthesized tracking signal source 100, described above. For example, the optical wavemeter 230 may comprise an optical interferometer, an absorption cell and a power meter as illustrated in FIG. 2 and described above.

In some embodiments (e.g. as illustrated in FIG. 3), the network analyzer 200 may further comprise a test unit or test set 240. The test set 240 may be configured to receive the RF test signal from the RF Source 210 and to apply the RF test signal to the DUT 202. Further, the test set 240 may be configured to receive the LO signal from the LO Source 220 and to use the LO signal to downconvert one or both of the RF test signal applied to the DUT 202 and a response signal produced by the DUT 202 to an intermediate frequency. The DUT response signal may be one or both of a reflected version of the applied RF test signal and a version of the applied RF test signal that is transmitted through the DUT 202, for example. According to various embodiments, the intermediate frequency is equal to the difference frequency between the RF test signal and the LO signal.

For example, the test set 240 may include a plurality of directional couplers to apply the RF test signal to the DUT 202 along with a plurality of mixers or frequency converters to downconvert the RF test signal and DUT response signal to the intermediate frequency. A first directional coupler may selectively sample the RF test signal and direct the sampled RF test signal to a first mixer, while a second directional coupler may selectively sample the DUT response signal and direct the sampled DUT response signal to a second mixer, for example. At the respective first and second mixers, the sampled RF test signal and the sampled DUT response signal are downconverted using the LO signal to IF signals at the intermediate frequency. A processor (not illustrated) of the network analyzer 200 may then analyze the IF signals to compute s-parameters of the DUT 202, according to various embodiments.

According to some embodiments (not illustrated), the network analyzer 200 further comprises an optical frequency shifter to provide the predetermined frequency shift described above. The frequency shifter may be substantially similar to the frequency shifter 180 described above with respect to the optically synthesized tracking signal source 100. For example, the optical frequency shifter may be configured to apply the predetermined frequency shift to the optical signal (e.g., one or both of the first optical signal and the second optical signal) of the first pair to produce a corresponding frequency-shifted optical signal of the second pair.

According to some embodiments (not illustrated), the network analyzer 200 further comprises a laser source configured to provide the corresponding optical signal of the second pair having the predetermined frequency shift. In particular, the laser source may be frequency-offset locked to another laser source that is configured to generate the optical signal of the first pair. According to some embodiments, the frequency-offset locked laser source may be substantially similar to the third laser source 190 of the optically synthesized tracking signal source 100, described above.

According to some embodiments (not illustrated), RF source 210 of the network analyzer 200 further comprises an optical combiner configured to combine a first optical signal generated by a first laser source with a tunable second optical signal generated by a tunable second laser source of the first optical signal pair. In some embodiments, the RF source optical combiner may be substantially similar to the first optical combiner 140 described above with respect to the optically synthesized tracking signal source 100. In particular, a first output of the RF source optical combiner may be connected to an input of the RF source square-law photodetector. In some embodiments, a second output of the RF source optical combiner may be connected to an input of the optical wavemeter 230.

According to some embodiments (not illustrated), LO source 220 of the network analyzer 200 further comprises another optical combiner configured to combine, for example, a frequency-shifted version of the first optical signal with the tunable second optical signal (both of the first pair) to provide the second optical signal pair. In some embodiments, the LO source optical combiner may be substantially similar to the second optical combiner 150 of the optically synthesized tracking signal source 100, described above. In particular, a first output of the LO source optical combiner may be connected to an input of the LO source square-law photodetector. In some embodiments, a second output of the LO source optical combiner may be connected to an input of the optical wavemeter 230.

According to some embodiments (not illustrated), the LO source 220 of the network analyzer 200 further comprises another LO source square-law photodetector. The other LO source square-law photodetector may be connected to the second output of the LO source optical combiner, for example. The other LO source square-law photodetector is configured to generate another LO signal. For example, the other LO signal may be complementary to the LO signal generated by the LO source square-law photodetector connected to the first output of the LO source optical combiner. By 'complementary' it is meant that the LO signals have a phase difference of about one hundred eighty degrees (180°). Complementary LO signals may be generated at two ports of the optical combiner due to a ninety degree (90°) phase shift of an optical field between the two ports of the second optical combiner 150, for example.

Figure 4:
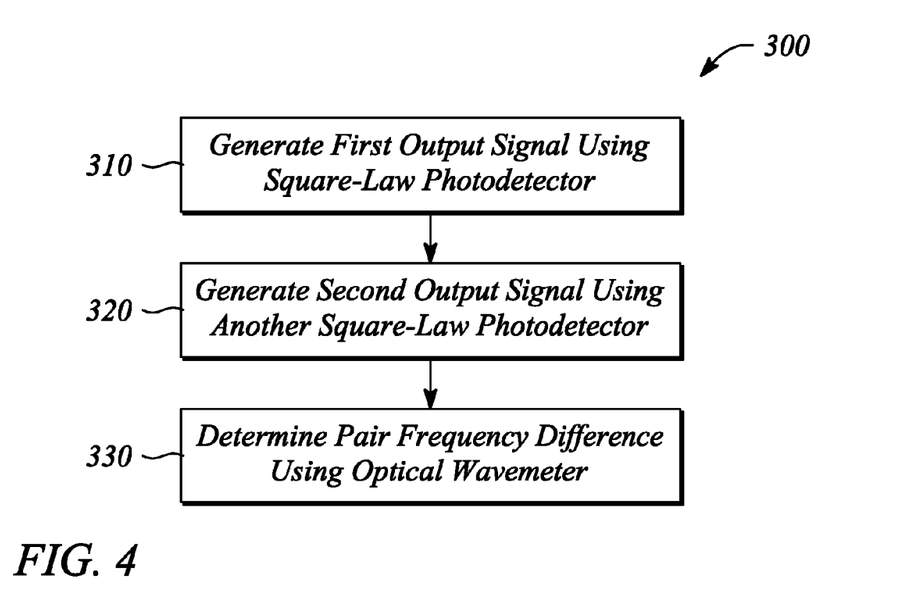
FIG. 4 illustrates a flow chart of a method of optically synthesizing a pair of tracking signals in an example, according to an embodiment of the principles described herein.

In some embodiments according to the principles described herein, a method of optically synthesizing a pair of tracking signals is provided. FIG. 4 illustrates a flow chart of a method 300 of optically synthesizing a pair of tracking signals in an example, according to an embodiment of the principles described herein. As illustrated in FIG. 4, the method 300 of optically synthesizing the tracking signal pair comprises generating 310 a first output signal using a square-law photodetector. The generated 310 first output signal has a frequency equal to a frequency difference between optical signals of a first pair of optical signals, according to various embodiments. In some embodiments, the square-law photodetector may be substantially similar to the first square-law photodetector 110 described above with respect to the optically synthesized tracking signal source 100. In some embodiments, the first output signal may be substantially similar to the first frequency-tracking output signal 102a also described above. In some examples, the first output signal generated 310 from the first pair of optical signals using the square-law photodetector may be an RF signal such as, but not limited to, an RF test signal. The RF test signal may be employed by a network analyzer to test a device under test (DUT).

The method 300 of optically synthesizing the tracking signal pair illustrated in FIG. 4 further comprises generating 320 a second output signal using another square-law photodetector. The generated 320 second output signal has a frequency equal to a frequency difference between optical signals of a second pair of optical signals. The second optical signal pair is a frequency-shifted version of the first optical signal pair, according to various embodiments. In some embodiments, the other square-law photodetector may be substantially similar to the second square-law photodetector 120 of the optically synthesized tracking signal source 100, described above. In some embodiments, the second output signal may be substantially similar to the second frequency-tracking output signal 102b, also described above. In some examples, the second output signal generated 320 from the second pair of optical signals using the other square-law photodetector may be an LO signal. The LO signal may be employed by a network analyzer to downconvert signals when testing the DUT using the RF test signal, for example.

According to various embodiments (e.g., as illustrated in FIG. 4), the method 300 of optically synthesizing the tracking signal pair further comprises determining 330 the frequency difference between respective optical signals of one or both of the first optical signal pair and the second optical signal pair using an optical wavemeter. According to some embodiments, the optical wavemeter may be substantially similar to the optical wavemeter 130 described above with respect to the optically synthesized tracking signal source 100. According to various embodiments, the first and second output signals generated 310, 320 respectively from the first and second optical signal pairs using square-law photodetectors track one another over a tunable frequency range of an optical signal (i.e., a tunable optical signal) of the first optical signal pair.

In some embodiments (not illustrated), the method 300 of optically synthesizing the tracking signal pair further comprises producing a first optical signal of the first optical signal pair using a first laser source. In some embodiments, the first laser source may be substantially similar to the first laser source 160 described above with respect to the optically synthesized tracking signal source 100. Similarly, the first optical signal may be substantially similar to the first optical signal $s_1$, also described above.

Further, in some embodiments (not illustrated), the method 300 of optically synthesizing the tracking signal pair further comprises producing a second optical signal of the first optical signal pair using a tunable second laser source. In some embodiments, the tunable second laser source may be substantially similar to the tunable second laser source 170 described above with respect to the optically synthesized tracking signal source 100. In particular, the tunable second laser source may be configured to provide the tunable frequency range of the second optical signal of the first optical signal pair. Similarly, the second optical signal may be substantially similar to the tunable second optical signal $s_2$, also described above. In some embodiments (not illustrated), the method 300 comprise combining the first and second optical signals using an optical combiner (e.g., such as the first optical combiner 140, described above)

In some embodiments (not illustrated), the method 300 of optically synthesizing the tracking signal pair may further comprise producing the second optical signal pair. The second optical signal pair is produced by frequency shifting an optical signal of the first pair by a predetermined frequency shift. For example, one or both of the first and the second optical signals may be frequency shifted by the predetermined frequency shift. In some embodiments, the method 300 further comprises combining optical signals including the frequency-shifted optical signal to produce the second optical signal pair. Thus, the second optical signal pair is a frequency-shifted version of the first optical signal pair. A frequency shifter substantially similar to the frequency shifter 180 of the optically synthesized tracking signal source 100, described above, may be used to frequency shift the optical signal of the first pair and produce the frequency-shifted version of the optical signal, according to some embodiments.

In other embodiments (not illustrated), the method 300 of optically synthesizing the tracking signal pair may comprise producing a frequency-shifted optical signal using a third laser source having a frequency-offset lock to either the first laser source or the second laser source, for example. For example the third laser may be frequency-offset locked to the first laser source and the frequency-shifted optical signal may be a frequency-shifted version of the first optical signal having a predetermined frequency shift provided by the frequency-offset lock. The method 300 of optically synthesizing the tracking signal pair that further employs the third laser source may further comprise combining the frequency-shifted optical signal with the second optical signal to produce the second optical signal pair. The second optical signal pair is or represents the frequency-shifted version of the first optical signal pair, according to some embodiments. The third laser source may be substantially similar to the third laser source 190 of the optically synthesized tracking signal source 100, as described above.

Thus, there have been described examples and embodiments of an optically synthesized tracking signal source, a network analyzer employing an optically synthesized tracking signal source and a method of optically synthesizing a pair of tracking signals that employ square-law based optical synthesis to produce frequency-tracking output signals. It should be understood that the above-described examples are merely illustrative of some of the many specific embodiments and examples that represent the principles described herein. Clearly, those skilled in the art can readily devise numerous other arrangements without departing from the scope as defined by the following claims.

What is claimed is:

1. An optically synthesized tracking signal source comprising:
   a first square-law photodetector configured to provide a first output signal having a frequency equal to a frequency difference between optical signals of a first pair of optical signals;
   a second square-law photodetector configured to provide a second output signal having a frequency equal to a frequency difference between optical signals of a second pair of optical signals, the second optical signal pair being a frequency-shifted version of the first pair of optical signals; and
   an optical wavemeter configured to determine one or both of the frequency difference between optical signals of the first pair of optical signals, and the frequency difference between optical signals of the second pair of optical signals,
   wherein the first and second output signals are tracking signals having a frequency offset determined by a relative frequency shift between the first and second pairs of optical signals.

2. The optically synthesized tracking signal source of claim 1, further comprising:
   a first optical combiner configured to combine a first optical signal of the first pair of optical signals with a second optical signal of the first pair of optical signals, a first output of the first optical combiner being connected to the first square-law photodetector; and a second optical combiner configured to combine the optical signals of the second pair, a first output of the second optical combiner being connected to the second square-law photodetector.

3. The optically synthesized tracking signal source of claim 1, further comprising a first laser source configured to provide a first optical signal and a tunable second laser source to provide a second optical signal having a tunable optical frequency, the first pair of optical signals comprising the first and second optical signals.

4. The optically synthesized tracking signal source of claim 1, wherein the optical wavemeter comprises:

an optical interferometer configured to receive a pair of optical signals; and a power meter configured to receive outputs from the optical interferometer and to determine a frequency difference of the optical signals within the received pair of optical signals from optical power measurements of the received outputs, wherein the received pair of optical signals comprises one or both of the first optical signal pair and the second optical signal pair, and wherein the frequency difference determination provides a measurement of the frequency of one or both of the first output signal and the second output signal of the optically synthesized tracking signal source.

5. A network analyzer comprising the optically synthesized tracking signal source of claim 1, wherein the first output signal is a radio frequency (RF) test signal configured to be applied by the network analyzer to a device under test (DUT) and the second output signal is a local oscillator (LO) signal configured to be used in a frequency converter of the network analyzer to downconvert to an intermediate frequency one or both of the applied RF test signal and a response signal from the DUT, the intermediate frequency being equal to the relative frequency shift between the first and second optical signal pairs.

6. The optically synthesized tracking signal source of claim 2, wherein the optical wavemeter is connected to a second output of one or both of the first optical combiner and the second optical combiner.

7. The optically synthesized tracking signal source of claim 3, further comprising an optical frequency shifter configured to apply a predetermined frequency shift to one or both of the first optical signal and the second optical signal of the first pair of optical signals, the second pair of optical signals comprising an output signal of the frequency shifter, the predetermined frequency shift being configured to determine the relative frequency shift between the first and second pairs of optical signals.

8. The optically synthesized tracking signal source of claim 3, further comprising a third laser source having a frequency-offset lock to the first laser source, the third laser source being configured to provide a third optical signal that is a frequency-shifted version of the first optical signal, the frequency-offset lock being configured to provide a predetermined frequency shift of the third optical signal relative to the first optical signal, wherein the second pair of optical signals comprises the third optical signal and the second optical signal, the predetermined frequency shift providing the relative frequency shift between the first and second pairs of optical signals.

9. The optically synthesized tracking signal source of claim 4, wherein the optical wavemeter further comprises:

an absorption cell configured to receive the pair of optical signals, the power meter being configured to receive an output from the absorption cell and to estimate an absolute frequency from the received output of one or both of the optical signals of the received optical signal pair.

10. The optically synthesized tracking signal source of claim 7, wherein the optical frequency shifter comprises an acousto-optic frequency shifter.

11. A network analyzer having an optically synthesized tracking signal source, the network analyzer comprising:

a radio frequency (RF) source comprising a square-law photodetector configured to generate an RF test signal from a first pair of optical signals, an optical signal of the first pair being tunable;

a local oscillator (LO) source comprising another square-law photodetector configured to generate an LO signal from a second pair of optical signals derived from the first pair, the second pair comprising an optical signal having a predetermined frequency shift relative to a corresponding optical signal the first pair; and an optical wavemeter configured to determine a frequency difference between optical signals of a respective pair of one or both of the first pair and the second pair, wherein the RF test signal and the LO signal are configured to track one another with a frequency difference corresponding to the predetermined frequency shift.

12. The network analyzer of claim 11, further comprising a test set configured to apply the RF test signal to a device under test (DUT), wherein the LO signal is used to downconvert to an intermediate frequency one or both of the RF test signal applied to the DUT and a response signal produced by the DUT, the intermediate frequency being equal to the frequency difference between the RF test signal and the LO signal.

13. The network analyzer of claim 11, further comprising an optical frequency shifter configured to apply the predetermined frequency shift to the corresponding optical signal of the first pair to produce a frequency-shifted optical signal of the second pair.

14. The network analyzer of claim 11, further comprising a laser source configured to provide the optical signal of the second pair having the predetermined frequency shift, the laser source being frequency-offset locked to another laser source configured to generate the corresponding optical signal of the first pair.

15. The network analyzer of claim 11, wherein the optical wavemeter comprises:

an optical interferometer configured to receive a pair of optical signals;

an absorption cell configured to receive the optical signal pair; and a power meter connected to receive outputs from both the optical interferometer and the absorption cell, the power meter being configured to determine from power measurements frequencies of the optical signals of the received pair, wherein the received optical signal pair comprises one or both of the first optical signal pair and the second optical signal pair, the determined frequencies providing an estimation of one or both of a frequency of the RF test signal and a frequency of the LO signal.

16. The network analyzer of claim 11, wherein the RF source further comprises an optical combiner configured to combine a first optical signal generated by a first laser source with a tunable second optical signal generated by a tunable second laser source, a first output of the RF source optical combiner being connected to an input of the RF source square-law photodetector, a second output of the RF source optical combiner being connected to an input of the optical wavemeter; and     wherein the LO source further comprises an optical combiner configured to combine a frequency-shifted version of the first optical signal with the tunable second optical signal, a first output of the LO source optical combiner being connected to an input of the LO source square-law photodetector.

17. The network analyzer of claim 16, wherein the LO source further comprises another square-law photodetector connected to a second output of the optical combiner of the LO source, the other square-law photodetector being configured to generate another LO signal that is complementary to the LO signal generated by the LO source square-law photodetector connected to the first output of the optical combiner of the LO source.

18. A method of optically synthesizing a pair of tracking signals, the method comprising:

generating a first output signal using a square-law photodetector, the first output signal having a frequency equal to a frequency difference between optical signals of a first pair of optical signals;

generating a second output signal using another square-law photodetector, the second output signal having a frequency equal to a frequency difference between optical signals of a second pair of optical signals, the second optical signal pair being a frequency-shifted version of the first pair of optical signals; and     determining one or both of the frequency difference between the optical signals of the first pair, and the frequency difference between the optical signals of the second pair using an optical wavemeter,     wherein the first and second output signals track one another over a tunable frequency range of an optical signal of the first optical signal pair.

19. The method of optically synthesizing a pair of tracking signals of claim 18, further comprising:

producing a first optical signal of the first optical signal pair using a first laser source;

producing a second optical signal of the first optical signal pair using a tunable second laser source;

frequency shifting the first optical signal by applying a predetermined frequency shift; and     combining the frequency-shifted first optical signal with the second optical signal to produce the second optical signal pair.

20. The method of optically synthesizing a pair of tracking signals of claim 18, further comprising:

producing a first optical signal of the first optical signal pair using a first laser source;

producing a second optical signal of the first optical signal pair using a tunable second laser source;

producing a frequency-shifted optical signal using a third laser source having a frequency-offset lock to the first laser source, the frequency-shifted optical signal representing a frequency-shifted version of the first optical signal, the frequency-offset lock providing a predetermined frequency shift to the frequency-shifted optical signal; and     combining the frequency-shifted optical signal with the second optical signal to produce the second optical signal pair.

\* \* \* \* \*